United States Patent [19]

Lempfer et al.

[11] Patent Number: 4,626,389
[45] Date of Patent: Dec. 2, 1986

[54] INSTALLATION FOR THE CONTINUOUS PRODUCTION OF MATERIALS USING EXOTHERMICALLY HARDENING BINDERS AND METHOD

[76] Inventors: Karsten Lempfer, Grunbergstr. 18; Gert Kossatz, Im Gettelhagen 156; Heinz Sattler, Warnowstr. 6, all of D-3300 Braunschweig, Fed. Rep. of Germany

[21] Appl. No.: 607,220

[22] Filed: May 4, 1984

[30] Foreign Application Priority Data

May 9, 1983 [DE] Fed. Rep. of Germany ....... 3316946

[51] Int. Cl.$^4$ .............................................. B29C 39/16
[52] U.S. Cl. .................................. 264/40.7; 156/39; 264/165; 264/333; 425/143; 425/371
[58] Field of Search .................... 156/39–46, 156/346–348, 359, 361; 425/143, 144, 145, 817 C, 371; 264/40.6, 40.7, 165, 333

[56] References Cited

U.S. PATENT DOCUMENTS

| 1,185,399 | 5/1916 | Hayes | 425/371 |
|---|---|---|---|
| 1,301,513 | 4/1919 | Sexton | 156/44 |
| 1,754,429 | 4/1930 | Knode | 156/39 |
| 3,895,087 | 7/1975 | Ottinger et al. | 264/46.2 |
| 3,929,947 | 12/1975 | Schwartz et al. | 156/39 |
| 3,936,254 | 2/1976 | Sawada et al. | 425/89 |
| 4,235,577 | 11/1980 | Groleau | 425/144 |
| 4,255,105 | 3/1981 | Hoffmann et al. | 425/817 C |
| 4,279,673 | 7/1981 | White et al. | 156/39 |
| 4,328,178 | 5/1982 | Kossatz | 264/69 |
| 4,375,950 | 3/1983 | Sato | 425/371 |
| 4,422,988 | 12/1983 | Kornylak | 425/145 |
| 4,455,268 | 6/1984 | Hinrichs et al. | 264/40.6 |

FOREIGN PATENT DOCUMENTS 2207799 9/1972 Fed. Rep. of Germany .

OTHER PUBLICATIONS

Zement, Bauverlag GMPH, Wiesbaden–Berlin 1970/1971, pp. 64 & 65.
Probst, Handbuch der Betonsteinindustrie Carl Marhold Verlag., Halle/Saale 1951, pp. 32–39.

*Primary Examiner*—Willard E. Hoag
*Attorney, Agent, or Firm*—Weingarten, Schurgin, Gagnebin & Hayes

[57] ABSTRACT

The invention provides an installation and method for the continuous production of materials using exothermically hardening binders, such as gypsum or cement, comprising a mixing and feeding station and a calibrating unit or press and also a control system for operating the installation. This installation is distinguished by the fact that the distance between the feeding station and the entrance to the calibrating unit or press on the one hand and the distance between the feeding station and the end of the calibrating unit or press on the other hand, taking into account the duration of the mixing and forming time, corresponds to the ratio between the period of time from the beginning of mixing to the beginning of stiffening and the period of time from the beginning of mixing to the end of hydration, and by the fact that the rate of advance of the continuous installation is controlled in such a way that the exothermically hardening binder reaches its maximum temperature shortly before leaving the calibrating unit or press.

13 Claims, 6 Drawing Figures

INSTALLATION FOR THE CONTINUOUS PRODUCTION OF MATERIALS USING EXOTHERMICALLY HARDENING BINDERS AND METHOD

BACKGROUND TO THE INVENTION

The invention relates to an installation for the continuous production of materials using exothermically hardening binders, such as gypsum or cement, comprising a mixing and feeding station and a calibrating unit or press and also a control system for operating the installation.

PRIOR ART

It is known that sheet-form materials containing gypsum, for example gypsum plaster board, can be produced in a continuous installation. To this end, plaster of paris (a sulfatic binder essentially consisting of $CaSO_4.\frac{1}{2}H_2O$) is made up with water and additives into a free-flowing slurry, applied to a continuously advancing, endless sheet of cardboard, covered with a second endless sheet of cardboard and formed at a forming station into an endless board surrounded on all sides by cardboard. After the binder has hardened, this endless board is cut into individual boards of the required length. For a given rate of advance, the distance between the forming station and the cutting station has to be gauged in such a way that complete hardening of the binder is possible, otherwise regular further processing and the production of boards of uniform quality are not guaranteed. For a given rate of advance, the length of the installation is dependent upon the hardening time of the binder. Since this hardening time, which will be defined in more detail hereinafter, is subject to considerable variation, the distance between the molding station and the cutting station gauged according to the rate of advance must correspond in the interests of safety to the longest hardening time to be expected. The result of this is that, where the binder hardens in a relatively short time, the greater capacity of the installation which is theoretically possible in that case, is not reached. This gives rise to economic disadvantages.

DE-AS 22 07 799 issued 9-14-1972 describes a process and an installation for the continuous production of gypsum-based components by pouring the gypsum into a straight, longitudinally extending molding channel, cutting or sawing the "strand" of gypsum thus formed into individual lengths and aftertreating the cut or sawn lengths. Although this publication refers to an automated process, it does not mention any particular control system. As a result, it is not possible with this process and installation to overcome the disadvantages mentioned in the foregoing.

For the sake of completeness, it is also mentioned that the book by Erich Probst entitled "Handbuch der Betonsteinindustrie" 1951, pages 33 to 39, contains information on the setting and hardening of gypsum whilst "Zementtaschenbuch" 1970/71, pages 64 et seq., contains information on the setting of cement. However, neither of these publications contains any indication as to how the above-mentioned disadvantages in the continuous production of materials using exothermically hardening binders, such as gypsum or cement, can be eliminated.

OBJECT OF THE INVENTION

The object of the present invention is to design an installation of the type mentioned at the beginning in such a way that it operates optimally in terms of an economical production.

EXPLANATION OF THE INVENTION

According to the invention, this object is achieved in that the distance between the feeding station and the entrance to the calibrating unit or press on the one hand and the distance between the feeding station and the end of the calibrating unit or press on the other hand, taking into account the mixing and forming time, corresponds to the ratio between the period of time from the beginning of mixing to the beginning of stiffening and the period of time from the beginning of mixing to the end of hydration and in that the rate of advance of the continuous installation is controlled in such a way that the exothermically hardening binder reaches it maximum temperature shortly before leaving the calibrating unit or press.

In this way, maximal output is obtained for the shortest possible length of the installation as a whole.

More particularly, the installation according to the invention may be designed in such a way that at least two temperature sensors situated at a distance from one another in the feed direction of the installation are arranged as actual-value indicators in the region of the calibrating unit or press. The arrangement may be such that the temperature sensors are preferably situated at the end of the calibrating unit or press, the second or last temperature sensor immediately preceding the end of the calibrating unit or press in the feed direction of the installation.

For further processing the temperature measurements supplied by the temperature sensors, the installation may be designed in such a way that a transducer, more particularly in the form of a differential amplifier, is provided for forming the actual value from the difference between the temperature measurement supplied by the last temperature sensor in the feed direction of the installation and the temperature measurement or the temperature measurements supplied by one or more temperature sensors preceding the last temperature sensor. In this connection, the actual value is preferably further processed in such a way that, in the case of a positive difference exceeding a predetermined value specific to the installation, the rate of advance of the continuous installation is reduced; in the case of a negative difference exceeding a predetermined value specific to the installation, the rate of advance of the continuous installation is increased and, in the case of an absolute difference below a predetermined set value, the rate of advance of the continuous installation is left unaltered.

Finally, it is possible to design the installation in such a way that several temperature sensors are arranged at a right angle to the feed direction, the average value of their temperature measurements being formed before the actual value is determined therefrom.

BRIEF DESCRIPTION OF THE DRAWINGS

Some embodiments of the invention are described in detail in the following with reference to FIGS. 1 to 3 of the accompanying drawings, wherein.

DETAILED DESCRIPTION OF THE INVENTION

The following description refers by way of example to the use of gypsum as binder for explaining the invention, although the invention is by no means limited to the use of gypsum.

To enable the invention to be better understood, the fundamentals of the setting mechanism of exothermically hardening binders will first be discussed in brief with reference to the example of gypsum. The production of gypsum-based materials is based on the processes of dehydration and rehydration. When gypsum dihydrate ($CaSO_4.2H_2O$) is calcined, sulfatic binders consisting essentially of semihydrate ($CaSO_4.\frac{1}{2}H_2O$) are formed through dehydration under suitable calcining conditions.

When the binder is mixed with water, the semihydrate passes into solution to saturation concentration and dihydrate is again formed through hydration, its solubility amounting to only about one quarter of that of the semihydrate, so that dihydrate separates in crystalline form from the solution oversaturated with dihydrate. This process continues until the semihydrate has been completely converted into dihydrate, a polycrystalline, stable solid being formed in this way.

In practice, the time aspect of the hydration process is characterized by the following characteristic quantities: beginning of stiffening, end of stiffening and end of hydration. Of these characteristics, the beginning of stiffening and the end of stiffening denote a certain consistency of the gypsum mixture whilst the end of hydration characterizes the end of the reaction by which the semihydrate is converted into the dihydrate. These time characteristics are each counted from the "beginning of sprinkling", i.e. from the point in time at which the binder and the water come into contact.

The reaction of the binder with water to form the dihydrate is an exothermic reaction, i.e. heat is released. Because of this, it is possible, by evaluating the hydration temperature-time curve, to determine the end of hydration, i.e. as the period of time from the beginning of sprinkling to the maximum of the temperature curve. In laboratory studies, this measurement is usually made under adiabatic conditions to prevent heat from flowing off and hence to prevent falsification of the temperature-time curve. For industrial processes, it is generally sufficient to determine the temperature profile under the particular conditions prevailing. Through the dissipation of heat to the surrounding atmosphere, the temperature maximum shifts towards shorter times. However, this may be ignored for the purpose in question here or may be compensated within an automatic control system.

For any binder based on calcium sulfate semihydrate, the parameters beginning of stiffening and end of hydration bear a constant ratio to one another. In general terms, it may be said that the period of time from the beginning of sprinkling to the beginning of stiffening and the period of time from the beginning of sprinkling to the end of hydration are in a ratio of 1:2.5. Although these setting times of the binder may be varied within wide limits, for example through the calcining conditions prevailing during production of the binder and/or by the addition of additives (accelerators, retarders), the ratio in question nevertheless remains substantially constant even under those conditions. In the case of special binders (for example synthetic gypsum produced by certain processes), this ratio may assume a different value, although even that value remains substantially constant, irrespective of the additives.

In the manufacture of sheet-form materials based on gypsum, a calibrating unit or press is frequently used, as for example in the production of gypsum plaster boards, glass-fiber-reinforced gypsum boards or gypsum-bonded boards by a semi-dry process according to U.S. Pat. No. 4,328,178. The general rule in the prior art is that calibration or pressing may begin at the latest with the beginning of stiffening and may be ended at the earliest after the end of stiffening and, better still, after the end of hydration. It is only in this way that the material is able to develop its maximum wet strength.

For the production processes mentioned above, it is more appropriate to use continuous installations which provide for higher output levels compared with batch-type installations and in which mixing and forming can be carried out continuously with considerable advantage in terms of production technology. One such installation is diagrammatically illustrated by way of example in FIG. 1. It consists of a suitable mixing/forming station 1 and of a calibrating unit or press 2. This calibrating unit or press 2 in turn consists of a lower circulating belt 3, to which the mixture is applied, and of an upper circulating belt 4. On their sides facing one another, both belts are supported by support systems 5 and 6 in such a way that a calibrating or compression gap 7 corresponding to the required panel or board thickness is formed and optionally comprises a compression element 8 on that side facing the mixing and forming unit.

In view of the already mentioned, constant time relationship between the beginning of stiffening and the end of hydration, there is an optimum according to the invention in regard to the length of the production installation. For a certain rate of advance and for certain length ratios of the installation which will be explained hereinafter, the ratio of the residence times of the mixture from the beginning of mixing to the beginning of the calibrating and compression gap on the one hand and from the beginning of mixing to the end of the calibrating and compression gap on the other hand corresponds to the above-mentioned ratio between the setting times (for example 1:2.5), so that, under the rule representing the prior art, according to which the calibrating or pressing operation should begin at the latest with the beginning of stiffening and should end at the earliest with the end of stiffening or end of hydration, the maximum wet strength of the material is reached.

Figure 1:
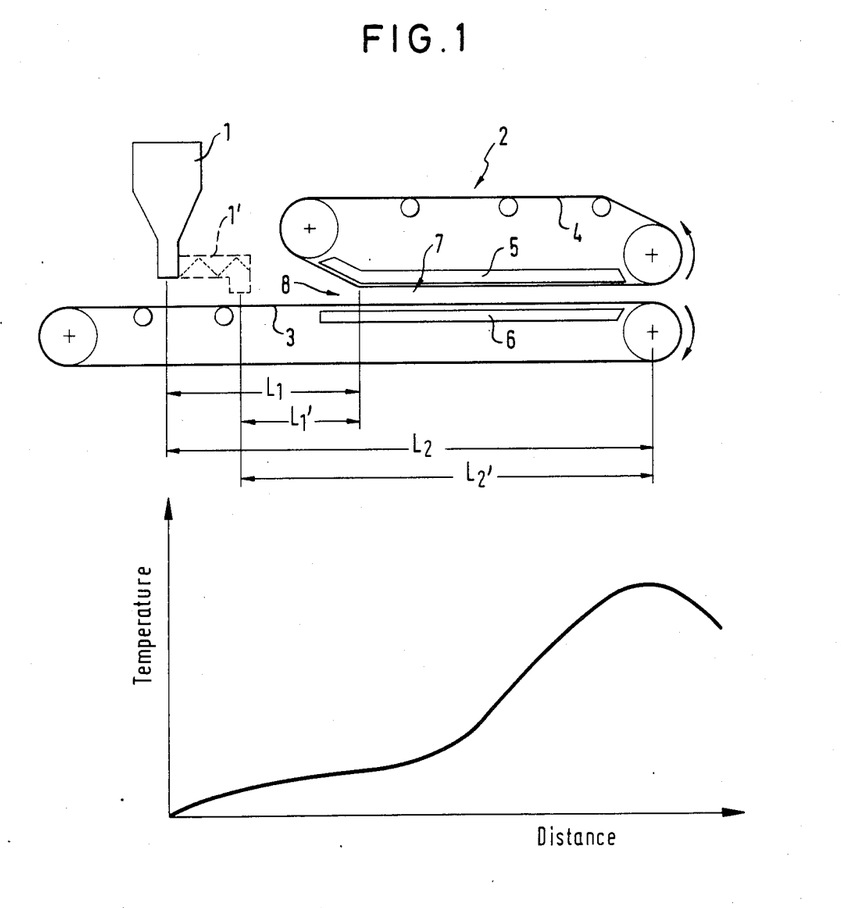
FIG. 1 diagrammatically illustrates an installation for the continuous production of materials using exothermically hardening binders for explaining the basic principle of the invention and the temperature profile in the material passing through the installation from which the material formed as product is produced.

To that end, the length $L_1$ in FIG. 1 from the point of application of the mixture to the beginning of the calibrating and compression gap is selected equal to the product of the rate of advance and the period of time between the beginning of mixing and stiffening whilst the length $L_2$ from the point of application of the mixture to the end of the calibrating and compression gap is selected equal to the product of the rate of advance and the period of time between the beginning of mixing and the end of hydration. In this connection, it is emphasized that the mixing and forming time is negligible in relation to the setting times, as is generally the case in continuous installations. Where the mixing and scattering time is no longer negligible in relation to the beginning of stiffening (represented by way of example in FIG. 1 by a screw conveyor 1'), both the length $L_1$ in FIG. 1 and also the length $L_2$ have to be shortened by an amount which is calculated as the product of the mixing and forming time and the rate of advance. In this case, the lengths in question become the lengths $L_1'$ and $L_2'$ (cf. FIG. 1).

If the rate of advance of the installation is denoted v, the period of time from the beginning of mixing to the beginning of stiffening $t_A$, the period of time from the beginning of mixing to the end of hydration $t_H$ and the duration of the mixing and forming time $t_M$, the distances in question may be represented as follows:

$$L_1 = v \cdot t_A$$

$$L_2 = v \cdot t_H$$

$$L_1' = v \cdot (t_A - t_M)$$

$$L_2' = v \cdot (t_H - t_M)$$

When the installation is operated under the described conditions, the calibrating and pressing operation begins with the beginning of stiffening of the mixture and is ended with the end of hydration. In this case, the temperature distribution in the direction of advance which is shown at the bottom of FIG. 1 is obtained in the installation.

However, the binders discussed in this example generally show variations of the order of some minutes in regard to the end of hydration. In addition, the setting times can be influenced, for example by the ambient temperature and, in cases where organic additives, for example woodchips, are used, by their water-extractable constituents and by other factors.

The variations in the setting behavior of the binders may be reduced in part by homogenizing different batches. In addition, the setting times may be standardized by the addition of additives in quantities measured to eliminate the variations. However, this requires above all exact control of the binders and continuous and expensive monitoring of production, experience having shown that variations in setting attributable to measuring and metering errors cannot be avoided.

It would be possible to select the lengths $L_1$ and $L_2$ of the installation in such a way that, even when the period of time from the beginning of mixing to the beginning of stiffening is very short, calibration or pressing take place at the right time and, even when the period of time from the beginning of mixing to the end of hydration is the longest which can be expected, setting within the calibrating unit or press is guaranteed. Such an approach would increase the capital cost of an installation of the type in question and would preclude economically favorable operation.

The interrelationships explained in the foregoing also apply correspondingly to other exothermically hardening binders, for example cement and modified sulfatic binders, in whose case the time factor of the hardening process also has to be taken into account in production.

The present invention obviates the disadvantages mentioned in the foregoing and, for a very small capital investment, provides for economically optimal operation through an independent control system for an installation for the continuous production of sheet-form materials using exothermically hardening binders which takes into account variations in the setting times of the binder used and always provides for optimal utilization of the installation.

According to the invention, the rate of advance in an installation of the type shown in FIG. 1 is controlled in such a way that the maximum temperature of the setting mixture is reached at the end of the calibrating unit or press. This function is performed by an automatic control system which acts, for example through a suitable circuit, on the drive motors of the calibrating unit or press together with the mixing and feeding station. Two continuously measuring temperature sensors 9, 10 are arranged in the vicinity of the calibrating unit or press 2 as the signal generators of the automatic control system.

Figure 2:
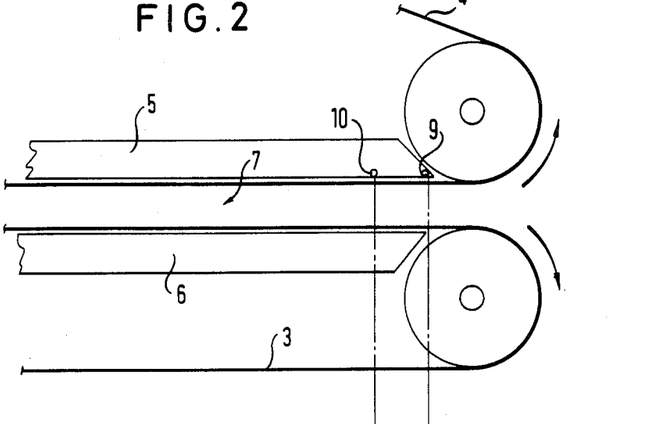
FIG. 2 shows part of the installation illustrated in FIG. 1 which is provided with temperature sensors.

These temperature sensors are preferably situated in the end part of the calibrating unit or press 2, as shown by way of example in FIG. 2 where the temperature sensors are denoted by the references 9 and 10. In this embodiment, the second or last temperature sensor 9 is arranged immediately in front of the end of the constant calibrating or compression gap 7.

For temperature measurement, temperature sensors 9, 10 measuring without contact may be arranged outside the calibrating unit or press 2 or, alternatively, temperature sensors measuring by contact, such as for example resistance thermometers or thermocouples, may be arranged in the fixed supporting system for the calibrating units or presses.

Instead of the individual temperature sensors 9 and 10 in FIG. 2, it would even be possible to arrange several temperature sensors transversely of the direction of advance for averaging purposes in order thus to neutralize possible variations over the width of the board.

The measurements of the temperature sensors converted into an electrical signal are continuously compared with one another in an automatic control system. The difference between the last measurement (in the direction of advance) and the measurement provided by the preceding temperature sensor or the preceding temperature sensors is used as the manipulated variable for regulating the rate of advance of the installation. This difference is compared with a predetermined set value.

Figure 2A:
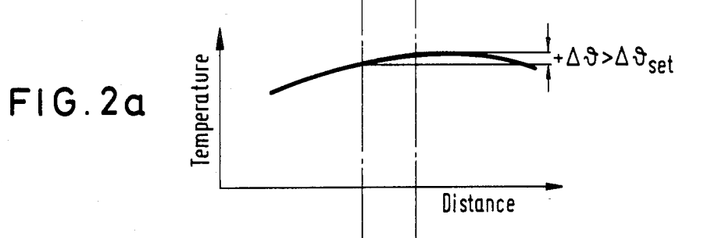
FIGS. 2a to 2c show temperature profiles which can occur in the installation shown in FIG. 2.

The speed of advance of the installation is preferably regulated on the basis of the following criteria:

(a) If the last measurement (in the direction of advance of the board 3) is larger than the measurement(s) of the preceding temperature sensor(s) by a difference $\Delta\theta_{set}$ to be defined according to the particular parameters of the installation (FIG. 2a: $+\Delta\theta$), the setting mixture has not reached its maximum temperature and the resulting control signal slows down the rate of advance of the board.

Figure 2B:
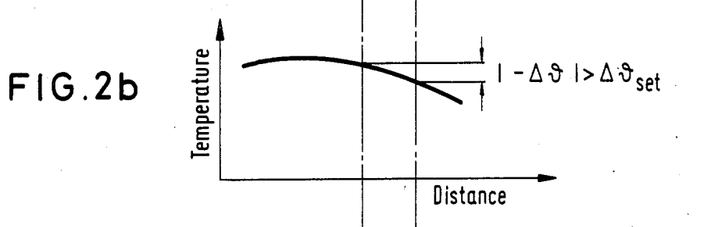

(b) If, by contrast, the measurement of the last temperature sensor (in the direction of advance of the board) is smaller by the difference $\Delta\theta_{set}$ than the measurement(s) previously obtained, the maximum temperature has already been reached and the rate of advance of the board is accelerated by a corresponding control signal (FIG. 2b).

Figure 2C:
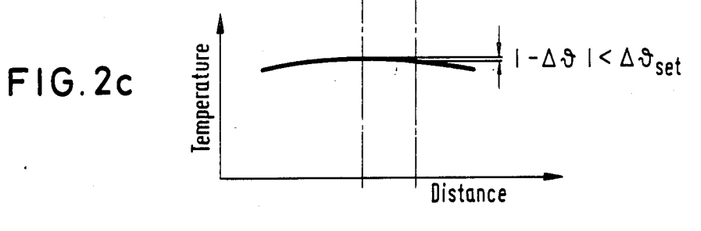

(c) Within these limits, i.e. where the last two sensors record the same temperature or in the case of a temperature difference smaller than the predetermined value $\Delta\theta_{set}$, no control signal is released and the rate of advance of the board remains unchanged (FIG. 2c).

Figure 3:
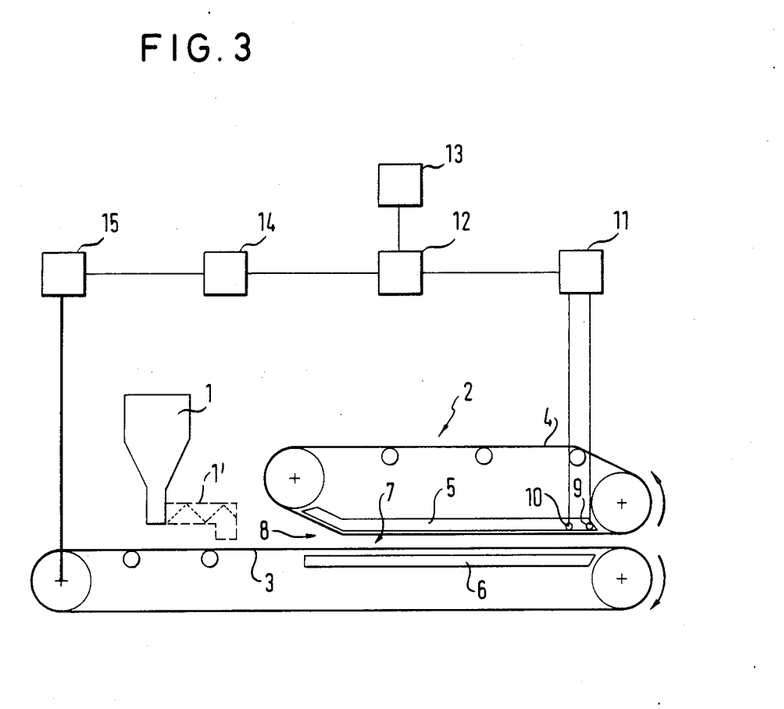
FIG. 3 shows one embodiment of a complete installation according to the invention.

The control circuit may be designed, for example, in such a way that, as shown in FIG. 3, the two temperature sensors 9 and 10 are connected to a transducer 11 which forms the difference between the measured temperatures as the actual value. This actual value is compared with a set value by a set value adjuster 13 in a control signal generator 12 and, depending on the result, a control signal is delivered to the final control element 14 which either leaves the drive motor 15 for the board 3 rotating at the same speed or increases or reduces its rotational speed.

What is claimed is:

1. A method for the continuous production of a product using an exothermically hardening binder material selected from the group consisting of gypsum and hydraulic cement comprising the steps of:

mixing the materials with water in a mixing and feeding station having an output in such a way as to define a first time period from the beginning of mixing to the beginning of stiffening and a second time period from the beginning of mixing to the end of hydration, where the end of hydration corresponds to the maximum temperature of the product being produced;

advancing the materials at a rate of advance from the mixing and feeding station to and through a calibrating or pressing unit having an entrance and an exit;

setting the ratio of the distance between the output of the feeding station and the entrance to the calibrating or pressing unit and the distance between the output of the feeding and the exit of the calibrating or pressing unit to correspond to the ratio between the first time period from the beginning of mixing to the beginning of stiffening and the second time period from the beginning of mixing to the end of hydration;

sensing the temperature of the advancing materials at points spaced proximate the exit of the calibrating or pressing unit; and controlling the rate of advance of the materials so that the exothermically hardening binder materials reach the maximum temperature shortly before leaving the calibrating or pressing unit.

2. A method for the continuous production of a product using an exothermically hardening binder material hardenable by hydration comprising the steps of:

mixing the material with water in a mixing and feeding station having an output in such a way as to define a first time period from the beginning of mixing to the beginning of stiffening and a second time period from the beginning of mixing to the end of hydration, where the end of hydration corresponds to the maximum temperature of the product being produced;

advancing the materials at a rate of advnace from the mixing and feeding station to and through a calibrating or pressing unit having an entrance and an exit;

setting the ratio of the distance between the output of the feeding station and the entrance to the calibrating or pressing unit and the distance between the output of the feeding station and the exit of the calibrating or pressing unit to correspond to the ratio between the first time period from the beginning of mixing to the beginning of stiffening and the second time period from the beginning of mixing to the end of hydration;

sensing the temperature of the advancing materials at points spaced proximate the exit of the calibrating or pressing unit; and controlling the rate of advance of the materials so that the exothermically hardening binder materials reach the maximum temperature shortly before leaving the calibrating or pressing unit.

3. The method of claim 2, wherein said temperature being sensed at said points are sensed at points that are spaced a predetermined distance from one another along a direction defined by the direction of advance of said materials.

4. The method of claim 3, wherein said temperatures are sensed as the materials move in the exit part of the calibrating unit or press, with a first temperature of said temperatures being sensed within the region of the calibrating unit or press and a second temperature of said temperatures being sensed at the exit of the calibrating unit or press in the direction of advance of the materials.

5. The method of claim 4, wherein said controlling step includes the step of determining the difference between the second temperature less the first temperature.

6. The method of claim 5, wherein said controlling step further includes the step of reducing the rate of advance in the case of a positive difference exceeding a predetermined value specific to the installation.

7. The method of claim 5, wherein said controlling step further includes the step of increasing the rate of advance in the case of a negative difference exceeding a predetermined value specific to the installation.

8. The method of claim 5, wherein said controlling step further includes the step of maintaining the rate of advance in the case of an absolute difference below a predetermined value specific to the installation.

9. The method of claim 3, wherein said sensing step includes the steps of sensing several temperatures at a right angle to the direction of advance of the materials, and the step of averaging the several temperatures taken at the right angle in the direction of advance of the materials.

10. An installation, comprising:

a conveyor for providing conveyance at a controllable rate of conveyance along a path defining an upstream portion and a downstream portion;

mixing means for providing a mixture including an exothermically hardening binder and water, said mixture being defined by a time between the beginning of mixing and the beginning of stiffening thereof and another time between the beginning of mixing and the ending of hydration thereof;

placing means for continuously placing said mixture at a first preselected point along an upstream portion of said path of said conveyor;

elongated calibrating or pressing means having a beginning and an ending positioned along the path of the conveyor with the beginning thereof at a second preselected point and the ending thereof at a third preselected point along said path of said conveyor, and cooperative with said conveyor for continuously calibrating or pressing said mixture including an exothermically hardening binder placed on said upstream portion of said path of said conveyor into a product having a desired shape at said downstream portion thereof;

said first, second, and third preselected points of said placing means and said calibrating or pressing means being so selected along said path of said conveyor that the ratio of the distance along the path of the conveyor between said first point of placing said mixture on said conveyor and said second point of the beginning of said calibrating or pressing means divided by the distance between said first point of placing said mixture on said conveyor and said third point of the ending of said calibrating or pressing means corresponds to the ratio of the time between the beginning of mixing of said mixture and the beginning of stiffening of said mixture divided by the time between the beginning of mixing of said mixture and the end of hydration of said mixture;

at least two temperature sensor means positioned proximate said ending of said elongated calibrating pressuring means at the downstream portion of said path of said conveyor for providing signals respectively representative of the temperature of said exothermic mixture at fourth and fifth points spaced along said path of said conveyor and within said elongated calibrating or pressing means at upstream and downstream positions thereof respectively;

means for providing a difference signal representative of the difference between the temperature at the fifth point less the temperature at the fourth point; and means coupled to said conveyor for varying the rate of conveyance along said path in response to said difference signal such that said rate is decreased if the difference between the temperature at the fifth point less the temperature of the fourth point is both positive and its absolute value is greater than a preselected temperature difference, is increased if the difference between the temperature at said fifth point less the temperature at said fourth is both negative and its absolute value is greater than said preselected temperature difference, and is held constant if the difference between the temperature at said fifth point less the temperature at said fourth point is smaller than said preselected temperature difference.

11. The installation of claim 10, wherein said sensor means includes at least two temperature sensors situated at a distance from one another in the direction of advance of the installation that each provide an actual value indication of the temperature of the materials in the vicinity of the elongated calibration or pressing means.

12. The installation of claim 11, wherein the temperature sensors are arranged in the ending of the elongated calibration or pressing means such that one of the temperature sensors is immediately in front of the ending in the direction of advance of the installation and the other temperature sensor is upstream thereof.

13. The installation of claim 10, wherein said temperature sensor means includes several temperature sensors each arranged at a right angle to the direction of advance, and means for averaging the outputs of the several temperature sensors.

* * * * *

UNITED STATES PATENT AND TRADEMARK OFFICE
CERTIFICATE OF CORRECTION

PATENT NO. : 4,626,389

DATED : December 2, 1986

INVENTOR(S) : Karsten Lempfer, et al

It is certified that error appears in the above-identified patent and that said Letters Patent is hereby corrected as shown below:

COVER PAGE, Column 1, after Inventors paragraph:, insert:
--Assignee: Fraunhofer-Gesellschaft zur
            Forderung der angewandten
            Forschung E. V., Munich, West Germany--.

Column 7, line 32, "feeding and" should read --feeding station and--.

Column 7, line 48, "material" should read --materials--.

Column 7, line 56, "advnace" should read --advance--.

Column 8, line 8, "temperature" should read --temperatures--.

Column 9, line 16, "pressuring" should read --pressing--.

Column 10, line 18, "calibration" should read --calibrating--.

UNITED STATES PATENT AND TRADEMARK OFFICE
CERTIFICATE OF CORRECTION

PATENT NO. : 4,626,389
DATED : December 2, 1986
INVENTOR(S) : Karsten Lempfer, et al It is certified that error appears in the above-identified patent and that said Letters Patent is hereby corrected as shown below:

Column 10, line 22 "calibration" should read
-- calibrating --.

Signed and Sealed this

Sixteenth Day of February, 1988

Attest:

*Attesting Officer*

DONALD J. QUIGG

*Commissioner of Patents and Trademarks*